Patented Dec. 14, 1948

2,456,357

UNITED STATES PATENT OFFICE 2,456,357

COMPLEX RESINS AND PROCESS OF MAKING

Harry L. Allen, Philadelphia, Pa., and Earl G. Kerr, Haddonfield, N. J., assignors to Allied Chemical & Dye Corporation, New York, N. Y., a corporation of New York No Drawing. Application October 31, 1945, Serial No. 625,959

8 Claims. (Cl. 260—45.1)

This invention relates to resins and more particularly to novel resinous products and a process for producing the same.

The invention has as an object to provide novel resinous reaction products of polymerizable compounds of the coumarone-indene-styrene type, urea or its thionalog, phenols and an aldehyde, which products possess properties rendering them useful in the production of films and coatings of superior flexibility and for other purposes. It is a further object of the invention to provide a process for the manufacture of such resins. Other objects and advantages will appear hereinafter.

The resins of the invention are made by reacting one or more polymerizable materials selected from the group consisting of coumarone, indene, styrene and their homologs with a phenol, an aldehyde and one of the group consisting of urea and thiourea, in the presence of an acid catalyst and an inert solvent for the resin. Preferably formaldehyde and urea are employed. When the reaction is complete, the resin may be recovered from the reaction mixture by distillation, preferably under vacuum. It is preferred to employ the reactants in proportions of from 5 to 35 parts by weight of polymerizable material, from 5 to 35 parts of urea or thiourea, from 35 to 90 parts of phenol, and from 1 to 5 mols of aldehyde for each mol of the other reactants.

The resins of the invention are thermosetting and form hard, transparent, baked coating films which are highly resistant to acids, alkalies and solvents such as aliphatic and aromatic hydrocarbons and alcohols. Films of the resins adhere well to metal surfaces and they may therefore be employed to advantage as priming coats for such surfaces. They may be blended with alkyd resins to form coatings which are not only acid-, alkali- and solvent-resistant, but possess a high degree of flexibility. Hence the resins are particularly valuable for applications requiring high flexibility and resistance to such reagents, e. g. oil-, grease- and solvent-resistant impregnating and coating agents for paper.

Oil fractions boiling within the range of 120° to 210° C. containing the polymerizable constituents employed in production of the resins are preferably utilized as the source of such polymerizable compounds in carrying out the invention. Such oils are formed in the distillation of coal and carburetion of water gas, and are obtained during the coking of coal, distillation of coal tar and water gas tar, or may be collected in coal gas and water gas distribution systems. Solvent naphtha, coke oven light oil, drip oil and water gas tar distillates are representative of such oils. These oils contain varying but substantial amounts of coumarone, indene, styrene and their homologs, and ordinarily contain mixtures of two or more of such compounds. The oils may be fractionized to obtain fractions in which different individual polymerizable compounds predominate. Thus, for example, fractions boiling within the range of 150° to 210° C. ordinarily contain indene as the chief polymerizable constituent; drip oil fractions boiling within the range of 120° to 150° C. may contain styrene as the chief polymerizable constituent; and fractions boiling within the range of 150° to 210° C. containing larger proportions of strene homologs, such as methylstyrene, and coumarone together with some styrene and indene, may be selected, the proportions of the individual polymerizable compounds depending on the source of the oil and the particular boiling range of the fraction. Preferably, fractions boiling within the range of 160° to 190° C. containing indene as the chief polymerizable constituent are employed in the manufacture of the resins. Instead of utilizing such oil fractions, the polymerizable materials may be employed in substantially pure form, e. g. synthetic indene or synthetic styrene may be utilized. Mixtures of such synthetic materials may also be employed. In order to aid in controlling the reaction, it is preferred to dilute the polymerizable material with an inert solvent such as benzene, toluene, xylene, or other hydrocarbon solvent which can be readily removed from the resinous product by distillation.

As the phenol reagent, either phenol or substituted phenols such as phenol homologs, e. g. the cresols, xylenols, higher boiling tar acids, resorcinol and pyrogallol, may be utilized. The phenolic reagent may be employed in substantially pure form, or tar acid mixtures such as commercially available mixtures of cresols and xylenols may be utilized advantageously.

In effecting reaction of the polymerizable material, phenol and aldehyde, any acid cataclyst may be employed. The preferred catalyst is sulfuric acid. Examples of other catalysts which may be utilized are: hydrochloric, phosphoric, lactic, oxalic and sulfonic acids.

The reaction mixtures should include a solvent which dissolves the resin as it is formed. Any solvent for the resin which is inert in the presence of the reactants and which may be readily removed from the resin may be employed. Suitable solvents include: butanol, amyl alcohol, hexanol, octyl alcohol and other high-boiling alcohols.

Aromatic solvents such as toluol and xylol may be employed as diluents in conjunction with the alcohol solvents.

The aldehydes which may be employed include: formaldehyde, paraformaldehyde, acetaldehyde and paraldehyde. The preferred aldehyde reagent is formaldehyde, which may be employed in any desired form, such as commercially available aqueous formaldehyde solutions, gaseous anhydrous formaldehyde or paraformaldehyde. Paraformaldehyde and paraldehyde are included within the scope of the terms "formaldehyde" and "acetaldehyde," respectively, as herein used. The amount of aldehyde employed is ordinarily from 1 to 5, preferably from 2.5 to 4 mols for each mol of other reactants introduced into the reaction mixture.

The reaction may be carried out by introducing the polymerizable material, urea or thiourea, phenol, aldehyde, catalyst and solvent into a reaction vessel and heating the reaction mixture to a temperature within the range of 90° to 105° C., e. g. to refluxing temperature, while agitating the mixture, until the reaction is complete. When the reaction is complete, the reaction mixture is distilled, preferably under vacuum, e. g. absolute pressure of 0" to 10" of mercury, to drive off the water, solvent and other unreacted materials which may be present. The distillation is discontinued when the still residue containing the resin reaches the desired consistency.

The following examples are illustrative of the invention. In the examples parts are given by weight.

*Example 1.*—83.5 parts of a carbolic oil fraction having a distillation range of 160° to 190° C. containing 60% by weight (about 50 parts) of polymerizable material, chiefly indene, 50 parts of urea, 50 parts of phenol, 250 parts of 37% aqueous formaldehyde solution, 200 parts of butanol, and 1.14 parts of sulfuric acid of 20% concentration were introduced into a reaction vessel equipped with an agitator and a reflux condenser and the mixture was heated to refluxing temperature for one hour. At the end of this period, the reaction mixture was subjected to vacuum distillation under absolute pressure of 2½" of mercury. 271 parts of clear liquid resin were obtained as residue. This residue contained 66.4% solids or 180 parts of available hard, clear resin.

*Example 2.*—83.5 parts of a coal tar oil fraction having a distillation range of 160° to 190° C. containing 60% (about 50 parts) of polymerizable material, chiefly indene, 50 parts of urea, 50 parts of a commercial mixture of meta- and paracresols, 250 parts of 37% aqueous formaldehyde solution, 200 parts of butanol, and 1.14 parts of sulfuric acid of 20% concentration were introduced into a reaction vessel equipped with an agitator and a reflux condenser and the mixture was heated to refluxing temperature for one hour. At the end of this period, the reaction mixture was subjected to vacuum distillation under absolute pressure of 3½" of mercury. 268 parts of clear liquid resin were obtained as residue. The residue contained about 63.2% of solids, available as about 169 parts of hard, clear resin.

*Example 3.*—83.5 parts of a coal tar oil fraction having a distillation range of 160° to 190° C. containing 60% (50 parts) of polymerizable material, chiefly indene, 50 parts of urea, 50 parts of a commercial mixture of xylenols boiling within the range of 210° to 217° C., constituted chiefly of 1,4,2 and 1,3,5 xylenols, 350 parts of 37% aqueous formaldehyde solution, 200 parts of butanol, and 1.14 parts of sulfuric acid of 20% concentration were introduced into a reaction vessel equipped with an agitator and a reflux condenser and the mixture was heated to refluxing temperature for one hour. At the end of this period, the reaction mixture was subjected to vacuum distillation under absolute pressure of 7" of mercury. 264 parts of liquid resin were obtained as residue, testing 69.2% solids, i. e. about 183 parts of available hard, clear resin.

Metal panels were coated with films of the resinous products of Examples 1, 2 and 3, the films were dried in air for about 30 minutes, and the panels were then baked at 150° C. for about 20 minutes. The baked films were found to be transparent and hard and resistant to attack by acids, alkalies and solvents.

Three batches of 20 parts of a 50% alkyd resin solution in xylol solvent were heated with 20 parts by weight of the respective resinous products of Examples 1, 2 and 3 until homogeneous mixtures were obtained. Films of the resultant compositions were applied to thin metal panels and were dried in air for a short time and then baked at 150° C. for 20 minutes. The resultant films were highly resistant to attack by acids, alkalies and solvents, and were sufficiently flexible so that they exhibited no microscopic indication of breakage of the films after the panels were bent over a mandrel ¼" in diameter and straightened. The proportions of resinous products of the invention and alkyd resin may be varied widely; compositions containing from 0.1 to 9.0 parts by weight of the resins disclosed herein for each part of alkyd resin are suitable for most purposes.

Accordingly, it will be seen the invention provides a process for the manufacture of novel resinous reaction products of polymerizable materials of the styrene-coumarone-indene type, urea or thiourea, phenols and formaldehyde or acetaldehyde, which resins are highly resistant to acids, alkalies and solvents. The resins form films which adhere strongly to metal surfaces and may be blended with alkyd resins to form coatings which are not only acid-, alkali- and solvent-resistant but are highly flexible. These properties render the resins superior to existing resins for many industrial applications.

Since certain changes may be made without departing from the scope of the invention, it is intended that the above description shall be interpreted as illustrative and not in a limiting sense.

We claim:

1. A process of making resins which comprises reacting together at an elevated temperature from 5 to 35 parts by weight of at least one polymerizable material selected from the group consisting of styrene, coumarone, indene and their homologs boiling up to 210° C., from 5 to 35 parts by weight of a member of the group consisting of urea and thiourea, from 35 to 90 parts by weight of phenolic material of the tar-acid group, and from 1 to 5 mols of a member of the group consisting of formaldehyde and acetaldehyde for each mol of said other reactants, in the presence of an acid catalyst and a solvent for the resin.

2. A process of making resins which comprises reacting together at an elevated temperature from 5 to 35 parts by weight of at least one polymerizable material selected from the group consisting of styrene, coumarone, indene and their homologs boiling up to 210° C., from 5 to 35 parts by weight of urea, from 35 to 90 parts by weight of phenolic material of the tar-acid group, and from 1 to 5 mols of formaldehyde for each mol of said other reactants, in the presence of an acid catalyst and a solvent for the resin.

3. A process of making resins which comprises heating to a temperature within the range of 90° to 105° C. a mixture of an oil containing from 5 to 35 parts by weight of at least one polymerizable material selected from the group consisting of styrene, coumarone, indene and their homologs boiling up to 210° C., from 5 to 35 parts by weight of urea, from 35 to 90 parts by weight of phenolic material of the tar-acid group and from 1 to 5 mols of formaldehyde for each mol of said polymerizable constituents, urea and phenolic material, in the presence of an acid catalyst and an alcoholic solvent for the resin.

4. A process as defined in the preceding claim in which the polymerizable content of the oil is at least chiefly indene, the catalyst is sulfuric acid and the solvent is butanol.

5. A resinous product of acid copolymerization prepared by the process described in claim 4.

6. A resinous product of acid-copolymerization prepared by the process described in claim 1.

7. A resinous product of acid-copolymerization prepared by the process described in claim 2.

8. A resinous product of acid-copolymerization prepared by the process described in claim 3.

HARRY L. ALLEN.
EARL G. KERR.

REFERENCES CITED

The following references are of record in the file of this patent:

UNITED STATES PATENTS

| Number | Name | Date |
| --- | --- | --- |
| 1,616,321 | Kessler | Feb. 1, 1927 |
| 1,844,571 | Goldschmidt | Feb. 9, 1932 |